United States Patent [19]

Nishii et al.

[11] Patent Number: 4,657,296
[45] Date of Patent: Apr. 14, 1987

[54] LICENSE PLATE MOUNTING DEVICE IN FRONT BUMPER

[75] Inventors: Shigetoshi Nishii, Sagamihara; Toshimitsu Matsuoka, Kawasaki; Toshio Tsuchida, Yokohama; Atsushi Hosaka, Hatano, all of Japan

[73] Assignee: Nissan Motor Co., Ltd., Japan

[21] Appl. No.: 877,505

[22] Filed: Jun. 23, 1986

[30] Foreign Application Priority Data

Jun. 24, 1985 [JP] Japan ................................ 60-137546

[51] Int. Cl.⁴ .............................................. B60R 13/10
[52] U.S. Cl. ........................................ 296/1 C; 293/1; 411/112; 411/172; 403/4
[58] Field of Search .................... 296/1 C; 293/1, 102; 411/103, 111-113, 172-175, 546; 403/3, 4; 24/621, 297; 40/200, 209, 210

[56] References Cited

U.S. PATENT DOCUMENTS

| 2,323,690 | 7/1943 | Tinnerman | 411/175 |
| 2,677,206 | 5/1954 | Paolini et al. | 296/1 C X |
| 2,931,471 | 4/1960 | Howard, Jr. | 40/200 X |
| 3,912,322 | 10/1975 | Weaver | 296/1 C |
| 4,408,939 | 10/1983 | Graff et al. | 411/174 X |

FOREIGN PATENT DOCUMENTS

| 0002238 | 1/1981 | Japan | 293/1 |
| 0209440 | 12/1982 | Japan | 296/1 C |
| 58-136847 | 9/1983 | Japan |  |

Primary Examiner—Robert B. Reeves
Assistant Examiner—Russell D. Stormer
Attorney, Agent, or Firm—Leydig, Voit & Mayer

[57] ABSTRACT

A bumper main body has a pair of recesses into each of which a blank cap is disposed and fixedly and releasably held at its clipping portions by a first arm of a U-shaped leaf nut mounted on each of projections. The blank caps each have an outer surface flush with an outer surface of the bumper main body and a blind hole aligned with one of internally threaded flanged holes of the U-shaped leaf nut. The blind hole has a thin-walled closed end which is removed when a fastening bolt is screwed through the blind hole into one of the flanged holes to fasten a license plate to the bumper main body. The blind hole is alignable with the other of the flanged holes when the clipping portions are reversely attached to the leaf nut.

9 Claims, 4 Drawing Figures

LICENSE PLATE MOUNTING DEVICE IN FRONT BUMPER

BACKGROUND OF THE INVENTION

1. Field of the Invention

The present invention relates in general to bumpers for motor vehicles and more particularly to a front bumper with a device for mounting a license plate.

2. Description of the Prior Art

Regulations as to mounting of front license plates are largely different from country to country or district to district though not as to rear license plates. For example, front license plates are not obligatory in a certain district in North America but obligatory in its adjacent district. Further, the pitches of license plate fastening bolts are different from country to country or district to district. In order to meet the above requirements, various kinds of front bumpers are necessary for one model of motor vehicle, resulting in a poor manufacturing efficiency.

In the case of a front bumper disclosed by the Japanese Utility Model Publication No. 58-136847, recessed portions are exposed to viewers when not covered by a front license plate, resulting in a deteriorated appearance.

SUMMARY OF THE INVENTION

In accordance with the present invention, there is provided a novel and improved front bumper for a motor vehicle. The front bumper comprises an elongated bumper main body, a recess provided to the bumper main body to serve as a bottom end wall of the recess, the projection having a pair of holes spaced in the longitudinal direction of the bumper main body, a U-shaped leaf nut having a pair of first and second arms and mounted on the projection in such a manner that the projection is interposed between the first and second arms, the first arm having a pair of holes respectively aligned with the holes of the projection while the second arm having a pair of threaded holes respectively aligned with the holes of the projection, and a blank cap disposed in the recess and having a resiliently defrmable clipping portion inserted into one of the holes of the projection through one of the holes of the first arm to be fixedly and releasably held by the first arm, the blank cap having a blind hole aligned with one of the threaded holes of the second arm and having a thin-walled closed end which is to be removed when a fastening bolt is screwed through the blind hole into the one threaded hole.

The above structure is quite effective for overcoming the above noted disadvantages and shortcomings inherent in the prior art device.

It is accordingly an object of the present invention to provide a novel and improved front bumper for a motor vehicle which can eliminate or at least reduce the necessity of a number of front bumpers for one model of a motor vehicle, whereby to improved the production or manufacturing efficiency.

It is another object of the present invention to provide a novel and improved front bumper of the above described character which can improved the appearance.

DETAILED DESCRIPTION OF THE PREFERRED EMBODIMENT

Referring to FIGS. 1 through 4, inclusive, a front bumper 10 is shown as being of the kind adapted for use with two kinds of license plates, e.g., a Japanese official license plate 12' and a certain North American district's official license plate 12 or for use without any license plate. The pitch L' of fastening bolts 14A, 14B for the Japanese license plate 12' (refer to FIG. 4) is a little larger than that pitch L for the certain North American district's lince plate 12 (refer to FIG. 2).

Figure 1:
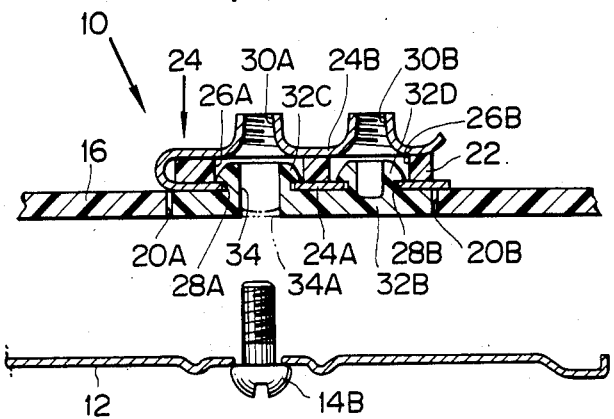
FIG. 1 is a fragmentary sectional view of a front bumper of the present invention adapted for use with a certain kind of front license plate.
Figure 2:
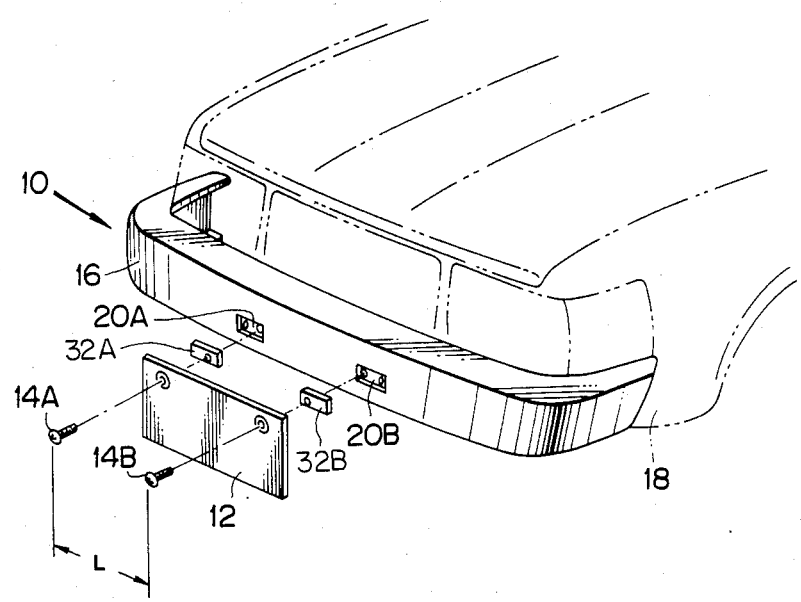
FIG. 2 is an exploded view of the front bumper and front license plate of FIG. 1.

More specifically, FIGS. 1 and 2 exemplarily show the front bumper 10 adapted to install the North American district's license plate 12. The front bumper 10 includes a front bumper main body 16 made of a synthetic resinous material and elongated to cross a front end of a vehicle body 18. The main body 16 has a pair of rectangular recesses 20A, 20B receding rearwardly of the vehicle body 18 and spaced in the longitudinal direction of the bumper main body 16. Hereinafter, description and illustration are mainly made in connection with the recess 20B since similar (though symmetrical) construction and arrangement are made to and around the recess 20A.

The bumper main body 16 has a pair of rectangular projections 22 serving as bottom walls of the recesses 20A, 20B. A U-shaped leaf nut 24 made of metal and having a pair of first and second parallel arms 24A, 24B in the form of a rectangular plate is mounted on the projection 22 in such a manner that the first and second arms 24A, 24B are positioned on the opposite sides of the projection 22, i.e., the projection 22 is interposed between the first and second arms 24A, 24B. The projection 22 is formed with a pair of holes 26A, 26B which are spaced in the longitudinal direction of the bumper main body 16. The first arm 24A is formed with a pair of holes 28A, 28B which are respectively aligned with the holes 26A, 26B, while the second arm 24B is formed with a pair of flanged holes 30A, 30B which are internally threaded and respectively aligned with the holes 26A, 26B.

Figure 3:
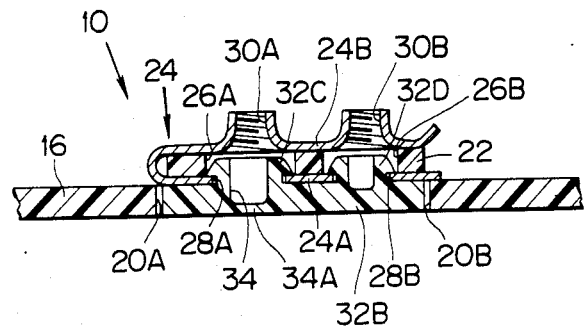
FIG. 3 is a view similar to FIG. 1 but showing the front bumper of the present invention adapted for use without any front license plate.
Figure 4:
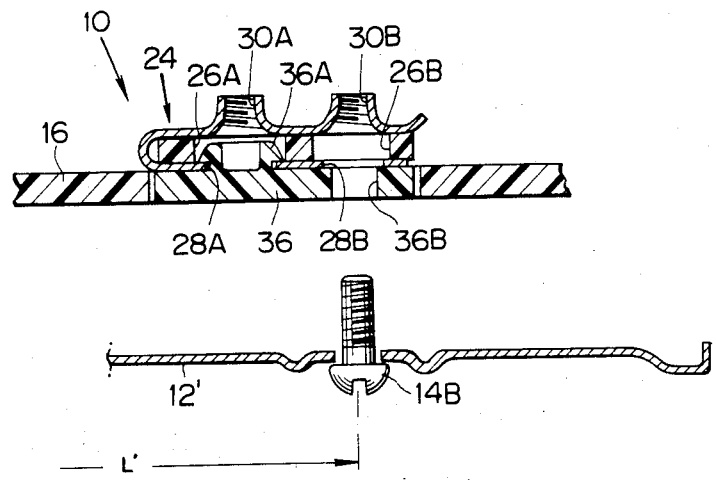
FIG. 4 is a view similar to FIG. 1 but showing the front bumper of the present invention adapted for use with another kind of front license plate.

A pair of rectangular blank caps 32A, 32B having substantially the same dimensions as those of the recesses 20A, 20B are put into the recesses 20A, 20B so that the front bumper 10 has a smoothly continuous outer surface as shown in FIG. 3 when a license plate 12 or 12' is not installed on the front bumper 10. The blank caps 32A, 32B each have a pair of annular clipping portions 32C, 32D which are resiliently deformable to pass through the holes 28A, 28B of the first arm 24A to be held fixedly and releasably thereby and inserted into the holes 26A, 26B of the projection 22, respectively. The blank caps 32A, 32B each having a blind hole 34 disposed concentrically with the clipping portion 32C and axially aligned with the flanged hole 30A. The blind hole 34 has a closed end which is closed by a thin wall 34A of which outer surface is flush with the outer surface of the blank cap 32A or 32B and therefore the outer surface of the bumper main body 16. The blind hole 34 is also alignable with the flanged hole 30B when the blank cap 32B assumes a 180° rotated position relative to the position shown in FIG. 1.

Upon installation of the certain North American district's license plate 12, the wall 34A is removed by drilling or the like machining. In this connection, the wall 34A is formed to be thin so that its removal is easy. The fastening bolts 14A, 14B are screwed into the flanged holes 30A through corresponding holes of the license plate 12 and the hole 34.

When the front bumper 10 is used without any license plate, the blank caps 32A, 32B are used without removing the thin wall 34A as shown in FIG. 3, thus making it possible to improve the appearance.

Upon installation of the Japanese license plate 12', the blank caps 32A, 32B are first removed and then installed again in such a manner as to assume 180° rotated positions relative to their former positions, i.e., in such a manner that the blind hole 34 is aligned with the flanged hole 30B. The thin wall 34A is removed by drilling or the like machining. The fastening bolts 14A, 14B are screwed into the flanged holes 30B through corresponding holes of the license plate 12'.

As shown in Fi9. 4, different blank caps 36 may be used for installation of the Japanese license plate 12'. The blank caps 36 each have a clipping portion 36A for engagement with the hole 28A of the first arm 24A and a through hole 36B aligned with the holes 26B, 28B and the flanged holes 30B so that the fastening bolt 14B or 14A can be screwed into the flanged hole 30B through the holes 36B and the holes 26B, 28B.

What is claimed is:
1. A front bumper for a motor vehicle, comprising:
an elongated bumper main body;
a recess provided to said bumper main body;
a projection provided to said bumper main body to serve as a bottom end wall of said recess, said projection having a pair of holes spaced in the longitudinal direction of said bumper main body;
a U-shaped leaf nut having first and second arms and mounted on said projection in such a manner that said projection is interposed between said first and second arms, said first arm having a pair of holes respectively aligned with said holes of said projection while said second arm having a pair of threaded holes respectively aligned with said holes of said projection; and
a blank cap disposed in said recess and having a resiliently deformable clipping portion inserted into one of said holes of said projection through one of said holes of said first arm to be fixedly and releasably held by said first arm, said blank cap having a blind hole aligned with one of said threaded holes of said second arm and having a thin-walled closed end which is to be removed when a fastening bolt is screwed through said blind hole into said one threaded hole.

2. A front bumper as set forth in claim 1, in which said blind hole is alignable with the other of said threaded holes when said clipping portion is inserted into the other of said holes of said projection through the other of said holes of said first arm to be fixedly and releasably held by said first arm.

3. A front bumper as set forth in claim 2, in which said blind hole is disposed concentrically with said clipping portion.

4. A front bumper as set forth in claim 3, in which said blank cap has a smoothly continuous outer surface which is flush with an outer surface of said bumper main body.

5. A front bumper for a motor vehicle having a body, comprising:
an elongated bumper main body crossing a front end of said vehicle body;
a pair of recesses provided to said bumper main body in such a manner as to recede rearwardly of the vehicle body and be spaced in the longitudinal direction of said bumper main body;
a pair of projections provided to said bumper main body to serve as bottom end walls of said recesses, said projections each having a pair of holes spaced in the longitudinal direction of the vehicle body;
a pair of U-shaped leaf nuts each having first and second arms and mounted on each of said projections in such a manner that each of said projections is interposed between said first and second arms, said first arm having a pair of holes respectively aligned with said holes of each of said projections while said second arm having a pair of flanged holes internally threaded and respectively aligned with said holes of each of said projections; and
a pair of blank caps respectively disposed in said recesses and each having a pair of resiliently deformable clipping portions which are respectively inserted into said holes of each of said projections through said holes of each of said first arms to be fixedly and releasably held by each of said first arms, said blank caps each having a blind hole aligned with one of said flanged holes of each of said second arms and having a thin-walled closed end which is to be removed when a fastening bolt is screwed through said blind hole into said one flanged hole.

6. A front bumper as set forth in claim 5, in which said blind hole of each of said blank caps is alignable with the other of said flanged holes of each of said second arms when said clipping portions are reversely inserted into said holes of each of said projections through said holes of each of said first arms to be fixedly and releasably held by each of said first arms.

7. A front bumper as set forth in claim 6, in which said one flanged holes are paired for attachment of a certain kind of license plate, while the other flanged holes are paired for attachment of another kind of license plate.

8. A front bumper as set forth in claim 7, in which said blind hole is disposed concentrically with one of said clipping portions.

9. A front bumper as set forth in claim 8, in which said blank caps each have a smoothly continuous outer surface which is flush with an outer surface of said bumper main body.

* * * * *